United States Patent
John et al.

(10) Patent No.: US 9,457,205 B2
(45) Date of Patent: Oct. 4, 2016

(54) TEXTILE LAMINATE COMPRISING A BARRIER LAYER HAVING ELASTIC PROPERTIES

(75) Inventors: Ruediger John, Putzbrunn (DE); Bernd Zischka, Putzbrunn (DE)

(73) Assignee: W. L. Gore & Associates GmbH, Putzbrunn (DE)

( * ) Notice: Subject to any disclaimer, the term of this patent is extended or adjusted under 35 U.S.C. 154(b) by 961 days.

(21) Appl. No.: 13/642,627

(22) PCT Filed: Apr. 19, 2011

(86) PCT No.: PCT/EP2011/056244
§ 371 (c)(1),
(2), (4) Date: Mar. 25, 2013

(87) PCT Pub. No.: WO2011/131675
PCT Pub. Date: Oct. 27, 2011

(65) Prior Publication Data
US 2013/0198941 A1    Aug. 8, 2013

(30) Foreign Application Priority Data

Apr. 22, 2010   (DE) .................... 20 2010 005 987 U

(51) Int. Cl.
*B32B 5/04*   (2006.01)
*B32B 27/06*  (2006.01)
(Continued)

(52) U.S. Cl.
CPC ......... *A62B 17/003* (2013.01); *A41D 31/0027* (2013.01); *B32B 5/026* (2013.01);
(Continued)

(58) Field of Classification Search
CPC ......... B32B 5/026; B32B 5/04; B32B 27/06; B32B 27/12; B32B 2250/03; B32B 2307/51; B32B 2437/00

USPC .................................................. 442/312, 318
See application file for complete search history.

(56) References Cited

U.S. PATENT DOCUMENTS 3,953,566 A   4/1976   Gore
4,187,390 A   2/1980   Gore
(Continued)

FOREIGN PATENT DOCUMENTS

| EP | 313261 | 10/1988 |
|---|---|---|
| EP | 1665945 | 12/2005 |
| WO | WO2006/002371 | 1/2006 |

OTHER PUBLICATIONS

Tortora, Phyllis G. Fairchilds Dictionary of Textiles 7th Edition. Fairchild Publications, New York. pp. 180, 287, 522.*

(Continued)

*Primary Examiner* — Jenna Johnson
(74) *Attorney, Agent, or Firm* — Kilpatrick Townsend & Stockton LLP

(57) ABSTRACT

The invention relates to a laminate, comprising at least one first textile layer and a second textile layer, wherein the first textile layer or the second textile layer comprises at least one thermally resistant fiber, also comprising at least one barrier layer which is arranged between the first textile layer and the second textile layer and is connected to the respective first textile layer and the respective second textile layer. The first textile layer is designed in the form of a single-bed knitted fabric or double-bed knitted fabric having tuck loops and the second textile layer is designed in the form of a double-bed knitted fabric having no tuck loops. The invention also relates to protective clothing comprising such a laminate.

30 Claims, 7 Drawing Sheets

(51) Int. Cl.
*B32B 27/12* (2006.01)
*A62B 17/00* (2006.01)
*B32B 5/02* (2006.01)
*A41D 31/00* (2006.01)
*B32B 5/18* (2006.01)
*B32B 5/26* (2006.01)
*B32B 7/14* (2006.01)
*B32B 27/02* (2006.01)
*B32B 27/08* (2006.01)
*B32B 27/30* (2006.01)
*B32B 27/34* (2006.01)
*D04B 1/18* (2006.01)

(52) U.S. Cl.
CPC ................. *B32B 5/04* (2013.01); *B32B 5/18* (2013.01); *B32B 5/26* (2013.01); *B32B 7/14* (2013.01); *B32B 27/02* (2013.01); *B32B 27/08* (2013.01); *B32B 27/12* (2013.01); *B32B 27/30* (2013.01); *B32B 27/34* (2013.01); *D04B 1/18* (2013.01); *B32B 2250/03* (2013.01); *B32B 2307/51* (2013.01); *B32B 2437/00* (2013.01); *Y10T 428/24818* (2015.01); *Y10T 442/413* (2015.04); *Y10T 442/45* (2015.04)

(56) References Cited

U.S. PATENT DOCUMENTS

| | | |
|---|---|---|
| 4,194,041 A | 3/1980 | Gore et al. |
| 4,230,838 A | 10/1980 | Foy et al. |
| 4,493,870 A | 1/1985 | Vrouenraets et al. |
| 4,532,316 A | 7/1985 | Henn |
| 4,725,481 A | 2/1988 | Ostapchenko |
| 2005/0124242 A1* | 6/2005 | Norvell .................. A41D 31/02 442/76 |
| 2007/0166503 A1* | 7/2007 | Hannigan .......... A41D 31/0027 428/59 |
| 2009/0049579 A1 | 2/2009 | Roberts |

OTHER PUBLICATIONS

Spencer, David J. Knitting Technology: A Comprehensive Handbook and Practical Guide Third Edition. Woodhead Publishing Limited, Cambridge England. pp. 148-153.*

Phillip Gibson, "Breathability" Comparison of Commercial Outerwear Shell Layers, May 18, 2009, [http://www.shelby.fi/images/support/breathability.pdf].

* cited by examiner

Double-bed knitwear:
Interlock (right/right crossed) weave

Dimensional stability according to the furnace test after heat exposure ISO 17493

Elongation/recovery (longitudinal direction)

Elongation/recovery (transverse direction)

Figure 6
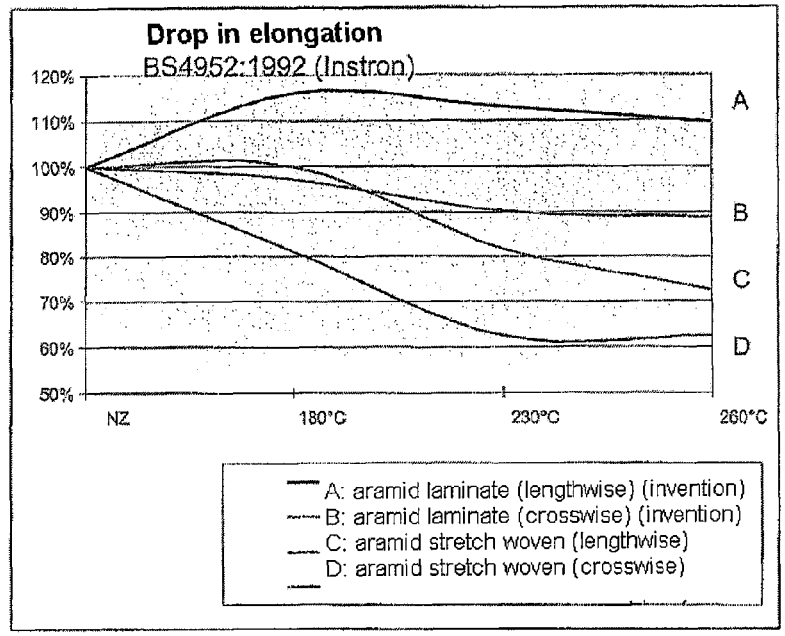
Figure 7
Sketch of elongation + elasticity (recovery/recovery capacity)
Material in original length      Elongation (under the influence of force)
for example, 100%
→ Force
At the end of force exposure      Recovery/recovery capacity
permanent deformation
Length after force exposure      Elasticity: for example, 80%

TEXTILE LAMINATE COMPRISING A BARRIER LAYER HAVING ELASTIC PROPERTIES

The present invention relates to a textile laminate with a barrier layer, especially for protective clothing, which has elastic properties. The invention also concerns protective clothing having an elastic textile laminate according to the invention.

Protective clothing must generally have a number of properties corresponding to its area of use. The protective clothing can then consist of several individual articles of clothing or can be an individual or multilayered article of clothing. For example, materials and material combinations required for use in protective clothing in the area of firefighting that protect effectively against steam, flames, radiating and spraying chemicals, wind and rain. The materials should also be breathable in order to reduce the hazard of heat buildup for the wearer.

The minimum requirements for materials used in protective clothing—clothing for protection against heat and flames—are established by international standards. For example, standard ISO 14116:2008 Protection against Heat and Flames defines materials, material combinations in clothing with limited flame propagation in order to limit the possibility that the clothing itself begins to burn and in so doing becomes a hazard to the wearer. Such materials and material combinations ordinarily contain heat-resistant and poorly flammable fiber materials or are provided with a flame-retardant finish in the form of a protective layer. Materials for thermally-resistant (also called heat-resistant) and low flammability fiber materials include aramids, melamine resin fibers, polyamide-imide, polyimide and PBI (polybenzimidazole). Permanently flame-resistant textile materials mostly contain these heat-resistant and low flammability fibers.

Protective clothing—clothing for protection against heat and flames, like firefighting protective clothing should also be water-tight and water vapor-permeable according to ISO 11613 (1999). This is achieved for example by using a water-tight and water vapor-permeable barrier layer (functional layer) which is integrated in the materials and material combinations for protective clothing in firefighting. The company W.L. Gore & Associates GmbH in Putzbrunn offers material combinations having textile heat resistant and flame-retardant materials and a water-tight and water vapor-permeable membrane, made for example as an ePTFE membrane (expanded polytetrafluoroethylene). Such material is offered, for example, under the name Gore-Tex® Fireblocker.

In addition to the properties of water tightness, air impermeability and water vapor permeability (breathability) it is often desired that protective clothing have elastic properties like stretch and recovery. Elastic properties offer a number of advantages, like better fit of the clothing article, comfort, reduced creasing or more leeway in the design.

It is generally known to integrate commercially available elastic fibers, like spandex, Lycra, Dorlastan, Elastane, DOW XLA (trademarks) or rubber in textile structures in order to achieve elastic properties for these textiles. These fibers are elastomeric or thermoelastic and are destroyed when exposed to high temperature. For example, they can melt or decompose. Elastic properties of textile and therefore the stability of the clothing article are therefore entirely lost, especially in exposure to high temperature. For this reason, elastic yarns are hardly used for flameproof textiles.

EP 313 261 A2 (W.L. Gore & Associates Inc.) describes a clothing article with an outer layer of stretchable knit or woven textile and an inner stretchable layer. The inner layer consists of a porous hydrophobic polymer layer coated with a hydrophilic polymer layer, which again is bonded to an elastic polymer textile. The outer textile is made of polyamide, polyester or wool. The inner textile is a woven or knit elastic polymer layer from Lycra, Spandex (DuPont trademarks). A shortcoming of these laminate structures is that Lycra, Spandex are thermoplastic materials that melt under the influence of heat and high temperature and are therefore destroyed. All the elastic properties are therefore also lost.

EP 1 665 945 A1 (Malden Mill Industries, Inc.) describes a multilayered flameproof fabric. The fabric consists of a laminate with an outer woven layer, an inner knit thermal layer in the form of a breathable membrane. The intermediate layer is arranged between the outer and inner layer and bonded to both layers. The outer woven layer has Spandex in the warp and weft in order to provide stretch in both directions for sufficient elasticity of the layer. The outer layer also has heat-resistant yarns from aramid, melamine, FR polyesters, etc. The inner knit layer also has heat-resistant yarns and has elastic properties based on the knit structure. However use of Spandex is problematical in the outer layer, since as soon as heat encounters the outer layer the thermoplastic Spandex melts and the outer layer looses its elastic properties.

The task of the present invention is to provide a heat-resistant and elastic laminate that does not lose its elastic properties even after exposure to high temperatures. In particular, the laminate should be suitable for use in protective clothing—clothing for protection against heat and flames, like firefighting clothing.

The task is solved according to the invention by a laminate with the features described and claimed herein. The invention also concerns protective clothing according to the features described and claimed herein. The dependent claims concern advantageous embodiments of the invention.

According to one aspect of the invention the laminate has at least a first textile layer and a second textile layer, the first textile layer or the second textile layer having at least one heat-resistant fiber. Moreover, the laminate has at least one barrier layer arranged between the first textile layer and the second textile layer and is joined to the first textile layer and the second textile layer. The first textile layer is designed in the form of one-bed knitwear or double-bed knitwear with tuck loops (FIGS. 3a/3b) and the second textile layer is designed in the form of double-bed knitwear without tuck loops (FIG. 2).

According to one variant of the invention the first textile layer is double-bed knitwear with tuck loops in the form of an interlock piqué knit. According to a further modification of the invention the second textile, layer is double-bed knitwear without tuck loops in the form of an interlock-right/right knit.

According to another variant of the invention the first textile layer is one-bed knitwear in the form of a piqué knit.

In one variant of the invention the first textile layer and the second textile layer have at least fractions of a heat-resistant fiber.

According to another aspect of the invention the laminate has at least a first textile layer and a second textile layer, the first textile layer and the second textile layer each having a heat-resistant yarn made of aramid. The first textile layer is designed here as a piqué knit and the second textile layer is an interlock knit. The laminate also has at least one barrier layer arranged between the first textile layer and the second textile layer and joined to the first textile layer and the second textile layer. The barrier layer has an ePTFE membrane, in which the barrier layer is joined by means of a discontinuously applied glue to the first textile layer and the second textile layer. The laminate then has an elastic stretchiness in the longitudinal direction of at least 50% and an elastic stretchiness in the transverse direction of at least 25% after heating with a temperature of 230° C. for 5 minutes.

A laminate can therefore be produced according to the invention with two textile layers in which both textile layers are knits, which, however, have a knit structure different from each other. The first textile layer is in the form of one-bed knitwear, especially piqué knit or two-bed knitwear with tuck loops. The second textile layer is in the form of double-bed knitwear without tuck loops, especially interlock-right/right knit. Such a laminate is permanently elastic and consequently the first textile layer and the second textile layer, without using thermoelastic fibers or other elastomers in the yarn, form a permanently elastic laminate. Such a laminate owing to the use of heat-resistant fibers of yarns is also fire and heat-resistant. According to another aspect the laminate is flame-retardant with limited flame propagation according to the requirements of ISO 14116:2008.

The first textile layer in the form of a one-bed knitwear, especially piqué knit or double-bed knitwear with tuck loops, has elastic properties, as does the second textile layer in the form of double-bed knit without tuck loops, especially interlock-right/right knitwear. However, the elastic properties of the two meshes are different from each other, as further explained below. The different elastic textile knit structures of these at least two textile layers produce an elastic behavior of the entire laminate. This elastic behavior is achieved without using commercially available elastic fibers. The elasticity of the laminate is permanent, since even after thermal stress by heating of the laminate with high temperatures the elastic properties are retained.

The elastic behavior of the laminate according to the invention is due to the different textile knit structures of the first textile layer and the second textile layer. The first textile layer is in the form of a one-bed knitwear or a double-bed knitwear with tuck loops.

The one-bed knitwear and the double-bed knitwear with tuck loops have an elastic stretchiness with elastic rebound. In one variant the one-bed knitwear is also present with tuck loops. This is the case in a right/left piqué weave. Especially in the one-bed and double-bed knitwear structures with tuck loops, the tuck loops ensure rebound of the textile layer after elastic rebound to the initial position after elastic elongation. A tuck loop is a mesh that is not knit but only inserted in the needle.

The double-bed without tuck loops has particularly good elastic stretching behavior. The meshes can be stretched without limitation within the stipulated thread length but only limited elastic rebound is present.

The second textile layer therefore permits particularly good elastic stretchiness and the first textile layer permits particularly good elastic rebound after stretching. The cooperation of these two textile layers results in the elastic properties of a laminate according to the invention.

The term knitwear summarizes different textile structures. The term knitwear can then include a first group of knit products like round knits and flat knits and also a second group of Raschel and warp knits.

According to another aspect of the invention the laminate after heating with a temperature of 230° C. for 5 minutes has an elastic stretchiness of at least 30% in the transverse direction. In one variant the laminate after heating with a temperature of 230° C. for 5 minutes has an elastic stretchiness of at least 25% in the longitudinal direction.

The laminate after heating with a temperature of 230° C. for 5 minutes especially has an elastic stretchiness in the longitudinal direction of at least 30% with an elastic rebound of at least 80% and an elastic stretchiness in the transverse direction of at least 25% with an elastic rebound of at least 95%.

In one variant the laminate after heating with a temperature of 230° C. for 5 minutes has an elastic stretchiness in a longitudinal direction of at least 70% with an elastic rebound of at least 80% and an elastic stretchiness in the transverse direction of at least 30% with an elastic rebound of at least 95%.

In another aspect of the invention the laminate after heating with a temperature of 230° C. for 5 minutes has an elastic stretchiness in the longitudinal direction of at least 50% and an elastic stretchiness in the transverse direction of at least 25%.

For example, the heat-resistant fiber is chosen from the group of materials including aramids, polyimides, polyamide-imide, cellulose fibers, melamine resins, polybenzimidazole (PBI). It is advantageous if the fiber is an aramid fiber or the yarn has aramid fiber fractions.

In a modification of the invention the barrier layer is joined to the first textile layer and the second textile layer by means of a discontinuously applied glue. For example the glue is applied in the form of glue spots or in the form of glue powder.

According to another aspect of the invention the barrier layer is air-impermeable and water vapor-permeable. The barrier layer is especially air-impermeable. The barrier layer can also be liquid-impermeable. The barrier layer is especially wind-tight, water-tight and water vapor-permeable.

For example, the barrier layer is water-tight and withstands a water entry pressure of at least 8 kPa (according to ISO 811-1981). It can have a water vapor penetration resistance Ret of <20 m$^2$ Pa/W (ISO 11092). For example, the barrier layer has an air-permeability of no more than 6 L/m$^2$/s (according to ISO 9237-1995).

The barrier layer can also be air-impermeable: air impermeability corresponding to an air permeability of <1 L/m$^2$/s (ISO 9237; 100 cm$^2$, 2.5 kPa); and/or wind-tight: wind tightness, corresponding to an air permeability of <50 L/m$^2$/s (ISO 9237; 100 cm$^2$, 2.5 kPa).

In another aspect of the invention the barrier layer is a membrane or film. For example the barrier layer is a porous membrane, like an ePTFE membrane. Such an ePTFE membrane can be provided with a continuously closed plastic layer.

The membrane can be chosen from the group of materials including polyolefins, polyesters, polyvinyl chlorides, polyvinylidene chlorides, polyurethanes or fluoropolymers.

A temperature-resistant (heat-resistant) yarn used according to one aspect of the invention has at least one yarn formed from numerous individual fibers. The heat-resistant yarn in the textile layer ensures that the laminate according to the invention has protection against heat and flame. For this purpose the resistant yarn has an LOI (limited oxygen index) value of at least 25. The first and second textile layer each have at least 50% heat-resistant yarns. The heat-resistant yarn is preferably a blend of aramid fibers.

A heat-resistant yarn can be chosen from the group of materials including aramids, polyimides, preox fibers, PBI or melamine resin fibers. A material consisting of heat-resistant yarn must not ignite or melt when tested according to ISO 17493 at a temperature of 180±5° C. The resistant yarn is preferably formed from blends with aramid fibers. In one variant the first textile layer and the second textile layer consists of 100% aramid fibers. Aramids are extremely flameproof, heat resistant (fire-resistant, heat-resistant) and tear-proof and therefore particularly suited for the laminate according to the invention.

A heat-resistant and low flammability fiber material can be characterized by the LOT value. The LOT value corresponds to the minimum content of oxygen with which the material still burns. Polymer systems with LOT values greater than 30-40% oxygen are self-extinguishing, i.e., inherently flame-resistant. Technical polymers have an LOT value of 16-30%. Generally fibers with an LOT value of >25 are classified as having low flammability. It is therefore desirable if the heat-resistant yarn has an LOT value of at least 25. The aforementioned fibers reach an LOT value of 28-33, for example, polyimide reaches an LOT value of 38, PBI a value of 40 and preox fibers even 56-58. The LOT value is available in the literature for the individual fibers, for example, in the Denkendorf fiber table of the Institute for Textile and Process Engineering, Denkendorf, Germany.

At the same time the laminate according to the invention can be made flame-retardant according to one aspect. According to ISO 14116:2008 with reference to flame propagation the highest index of 3 is reached. This means that no flame propagation, no hole formation, no burning drops, no afterglow and no afterburning time of greater than 2 s occur in the material according to the invention when exposed to flame. The laminate according to the invention therefore satisfies ISO 11613 (1999) for Protective Clothing for Firefighters or also ISO 11612 for Protective Clothing—Clothing for Protection against Heat and Flames. A laminate for protective clothing can therefore be made available which is permanently elastic and offers protection against heat and flames.

In another aspect of the invention protective clothing is provided which has at least partially a laminate of the above described type. The laminate according to the invention could be a component of a protective clothing article. A protective clothing article can also be fully constructed from a laminate according to the invention.

Such a protective clothing article is particularly useful for pilots, firefighters and drivers of tank trucks, since the elastic function of the clothing is retained even after thermal loading.

The protective clothing is designed, for example, in the form of a coat, jacket, trousers, vests, overalls, head covering, balaclava, gloves or a combination of these.

Aspects and advantages of the invention are further explained below by means of figures that concern variants of the invention. In the corresponding drawings:

FIG. 1 shows a sketch of a variant of a laminate according to the invention,

FIG. 2 shows a view of a knit connection of a second textile layer according to one variant of the invention, especially a double-bed knitwear without tuck loops in the form of an interlock-right/right knit, FIG. 3a shows a view of a knit in a first textile layer according to a variant of the invention, especially one-bed knitwear with tuck loops in the form of a right/left piqué knit, FIG. 3b shows a view of a knit in a first textile layer according to a variant of the invention, especially two-bed knitwear with tuck loops in the form of an interlock piqué knit, FIG. 4 shows a graphic presentation relating to dimensional stability according to the furnace test after exposure to heat, ISO 17493, for different product samples and different temperatures, FIG. 5 shows a graphic presentation relating to elongation/recovery in longitudinal direction (FIG. 5A) or transverse direction (FIG. 5B) for different temperatures for three product samples, FIG. 6 shows a graphic presentation relating to the drop in elongation versus temperature for two product samples, FIG. 7 shows a schematic view concerning the terms elongation and elasticity, FIG. 8 shows a clothing article equipped at least partially with a laminate according to the invention.

FIG. 1 shows a variant of a laminate 10 according to the invention with a first textile layer 20, a second textile layer 30 and a barrier layer 40, arranged between the textile layers 20, 30. The three layers are joined to each other to laminate 10. Joining of the layers with each other can occur via appropriate methods. It is important in selecting the joining technique not to significantly restrict the functionality of the barrier layer 40. For example, the layers can be joined to each other by means of glue. In one variant the glue is discontinuously present in the form of spots, powder, a network or lattice in order not to restrict the function of barrier layer 40. In another variant the glue is a continuous glue layer, preferably from a water vapor-permeable glue material. Other joining techniques could be welding, ultrasonic welding (for example, spot welding) or stitching.

The barrier layer 40 in one variant is air-impermeable and water vapor-permeable and therefore forms a barrier against undesired or harmful gases. The barrier layer 40 is preferably air-impermeable. In one variant the barrier layer 40 has an air permeability of no more than 1 L/m$^2$/s (ISO 9237-1995). At the same time the barrier layer 40 permits passage of water vapor, in which case the barrier layer 40 in one variant has a water vapor penetration resistance Ret of <20 m$^2$ Pa/W (ISO 11092). In a preferred variant the barrier layer 40 is water vapor-permeable but liquid-tight, especially water-tight. For example, the water-tight barrier layer 40 withstands a water entry pressure of at least 8 kPa. The barrier layer 40 can also be water vapor-permeable and wind-tight or water vapor-permeable, water-tight and wind-tight. The presence of the barrier layer 40 in laminate 10 increases the wear comfort of a clothing article at least partially having this laminate or consisting of it, since sweat of the wearer is transported from the inside out and penetration of water and/or wind is simultaneously prevented. The wear comfort is increased relative to a structure having a water vapor-impermeable barrier layer.

The barrier layer 40 can be a film or membrane. Appropriate materials for barrier layer 40 according to the present invention are fluoropolymers like polytetrafluoroethylenes, polyesters, polysulfones, polyurethanes, polyurethane-polyester, polyethylene, polyether sulfones, polycarbonates, silicones, polyolefins, polyacrylates, polyamides, polypropylene including polyether-esters and their combinations. The barrier layer can be porous or nonporous.

A membrane of expanded polytetrafluoroethylene (ePTFE) is preferably used. The ePTFE of the membrane can be designed with a thickness between 5 and 500 µm, preferably between 25 and 300 µm. An ePTFE membrane is particularly suited, since it is very stable relative to heat and high temperatures and neither burns nor melts. The porosity and pore size of the ePTFE membrane is preferably chosen so that gas diffusion is not prevented. The average pore size can be 0.02-3 µm, preferably 0.1-0.5 µm. The porosity is 30-90%, preferably 50-80%. At the same time the material is water-tight. A method for production of such porous membranes from expanded PTFE is disclosed, for example, in U.S. Pat. No. 3,953,566 and U.S. Pat. No. 4,187,390.

In one variant the ePTFE membrane has a water vapor-permeable continuous hydrophilic polymer layer. Without restriction to this, appropriate continuous water vapor-permeable polymers are those from the family of polyurethanes, the family of silicones, the family of copolyether-esters or the family of copolyether-ester amides. Appropriate copolyether-esters of hydrophilic compositions are disclosed in U.S. Pat. No. 4,493,870 and U.S. Pat. No. 4,725,481. Appropriate polyurethanes are described in U.S. Pat. No. 4,194,041. Appropriate hydrophilic compositions can be found in U.S. Pat. No. 4,340,838. A preferred class of continuous water vapor-permeable polymers are polyurethanes, especially those containing oxyethylene units, as described in U.S. Pat. No. 4,532,316.

The barrier layer in one variant can also have a film or membrane of the aforementioned type if the barrier layer is multilayered. For example, in a multilayered variant the membrane is joined on one or both sides to an additional layer, for example, a support layer and/or another functional layer.

The first textile layer 20 and/or the second textile layer 30 of the laminate 10 according to the invention have at least one temperature-resistant (heat-resistant) fiber, especially heat-resistant yarn. The heat-resistant fiber is preferably aramid fiber with a heat-resistant yarn and aramid yarn. In one variant the two textile layers 20, 30 each are at least 50% of a heat-resistant yarn.

FIG. 2 shows a schematic view (technical patterns for a knitwear technique) of a knit of a second textile layer according to a variant of the invention. FIG. 2 shows a knit according to two rows 1 and 2 (a pattern repeat), which repeats after every second row. The needles in FIG. 2 are denoted 13, the threads 14 and the meshes 15.

Figure 1:
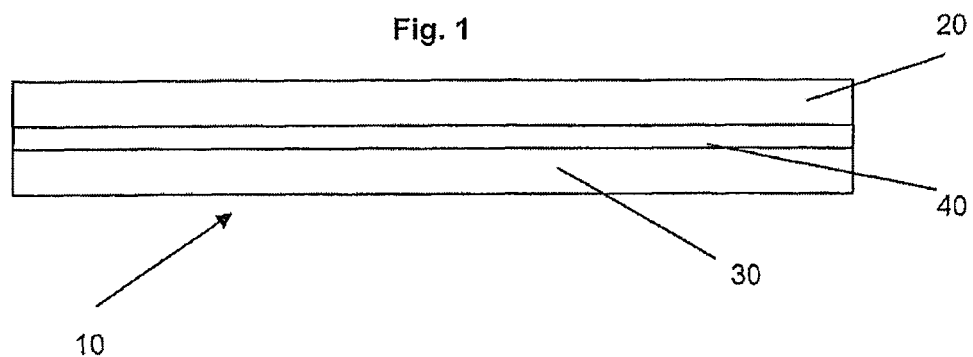

FIG. 3a shows one-bed knitwear with tuck loops according to two rows 1 and 2 (one pattern repeat) which repeats after every second row. The needles in FIG. 3a are denoted 16, the threads 17, the tuck loops 19 and the meshes 18.

FIG. 3b shows double-bed knitwear with tuck loops according to three rows 1, 2 and 3 (one pattern repeat) which repeats after every third row. Here again the needles are denoted 16, the threads 17, the tuck loops 19 and the meshes 18.

FIG. 3a shows especially a knit in the fashion of one-bed knitwear with tuck loops here in the form of a right/left piqué knit or right/left piqué knit weave. According to one variant of the invention the textile layer 20 according to FIG. 1 is designed in the form of a right/left piqué knit as shown by means of FIG. 3a.

FIG. 3b shows knitwear in the fashion of a double-bed knit with tuck loops here in the form of an interlock piqué knit or interlock piqué knit weave. According to one variant of the invention the textile layer 20 according to FIG. 1 is designed to form an interlock piqué knit as shown by FIG. 3b.

The technical meaning of the terms piqué knitwear and interlock knitwear and their design are known to one skilled in the art. From the standpoint of one skilled in the art they therefore require no separate definition. The corresponding design is also known to one skilled in the art. Practical examples are shown in FIGS. 2, 3a, 3b as explained above.

Figure 2:
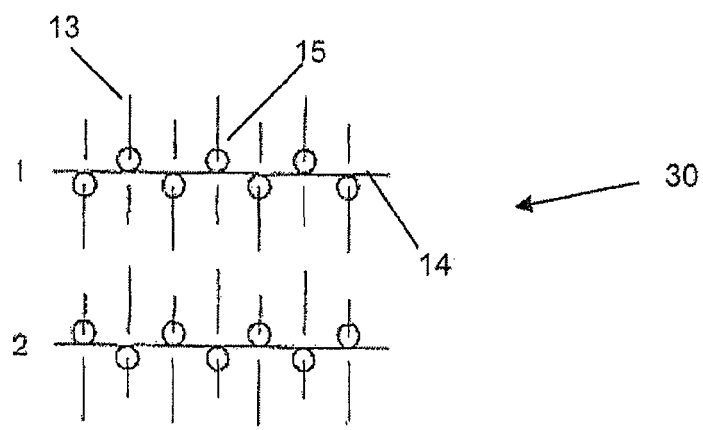
FIG. 2 shows knitwear in the fashion of a double-bed knitwear without tuck loops, here in the form of an interlock-right/right knit or interlock right/right knit weave. According to one variant of the invention the textile layer 30 according to FIG. 1 is designed in the form of an interlock-right/right knit as shown by FIG. 2.
Figure 3:
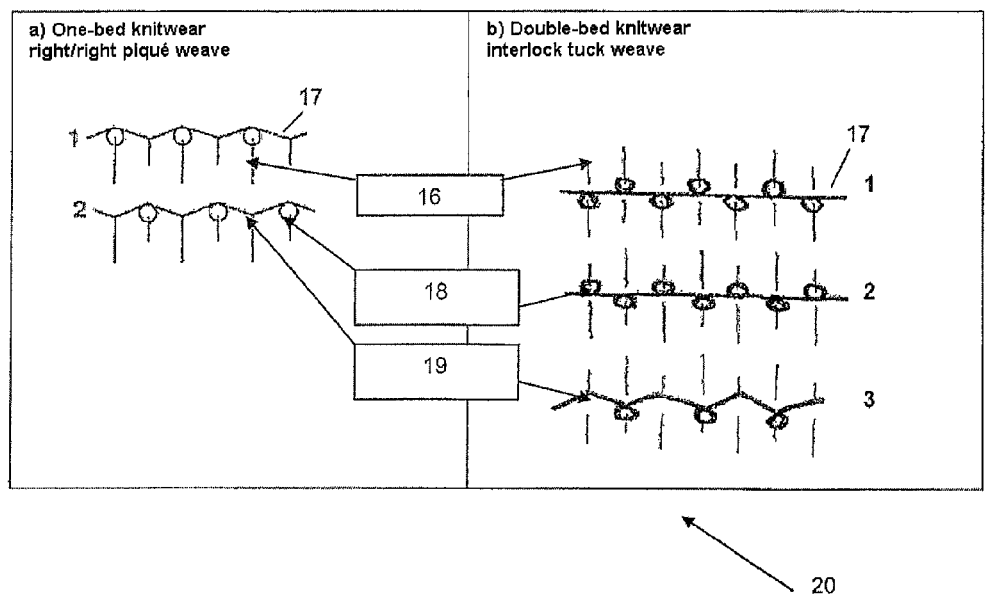
FIGS. 3a and 3b show schematic view (technical patterns for the knitwear technique) of a knit weave of a first textile layer according to another variant of the invention.

A laminate 10 constructed with textile layers 30 and 20 according to FIGS. 2 and 3, as schematically shown in FIG. 1, is permanently elastic and consequently the first textile layer 20 and the second textile layer 30 form a permanently elastic laminate 10 without using a thermoplastic yarn. Such a laminate is also fire- and heat-resistant owing to the use of heat-resistant fibers and yarns.

The laminate according to the invention is preferably designed so that it [has] the dimensional stability required in clothing specifications, for example, according to ISO 11612. For example, a laminate has a dimension change after heat exposure of less than 5% at 180° C. and 260° C., preferably less than 3%.

The following sought properties A) to D) of one variant of the laminate according to the invention are:
A) Desired Dimensional Stability:
Less than 5% (for example, according to ISO 11612 for Protective Clothing—Clothing for Protection against Heat and Flames)
Reference to ISO 111612 for heat resistance (chapter 6.2):
Chapter 6.2.1: Heat resistance at a temperature of 180±5° C.:
During testing according to ISO 17493 at a temperature of 180±5° C. no material used in the clothing and/or clothing composition may ignite or melt and must not shrink by more than 5%.
Chapter 6.2.2: Optional requirement—heat resistance at a temperature of 260±5° C.:
If it is prescribed that the material of one-layer clothing or the inner liner of a multilayer clothing is worn on the skin the material must be tested according to ISO 17493 at a temperature of 260±5° C. The material must satisfy the requirements according to 6.2.1 and must not ignite or melt and must not shrink by more than 10%.
COMMENT: Shrinkage due to heat exposure can lead to an adverse effect on the thermal protective effect, since the insulating air layer between the clothing and body is reduced. Heat shrinkage must therefore be avoided in protective clothing, especially in cases where there is a hazard from heat or flames, which could affect a large percentage surface of the clothing.
B) Desired Elongation:
Greater than 25-100% to improve ergonomics
C) Recovery (Recovery Capacity):
Complete or high recovery of the original dimensions, ideally 100% (below 80% is generally unacceptable because of deterioration of fit)
For this purpose FIG. 7 shows a sketch of elongation and elasticity (recovery/recovery capacity). Initially a material is shown in the original length, which is stretched by exposure to a force, for example, by 100%. This is shown in FIG. 7 by rightward elongation in which the original material is elongated by its length so that the material now has twice the length in comparison to the original state. In the depiction underneath after the end of force exposure the material recovers (recovery/recovery capacity in FIG. 7), in the present example by 80% of its original length so that after the end of force exposure a deformation remains (permanent deformation in FIG. 7) and the material is therefore longer in comparison with its original length. In the present example the material accordingly has an elasticity of 80%.

Complete recovery to the original length, on the other hand, would mean an elasticity of 100%.

Figure 4:
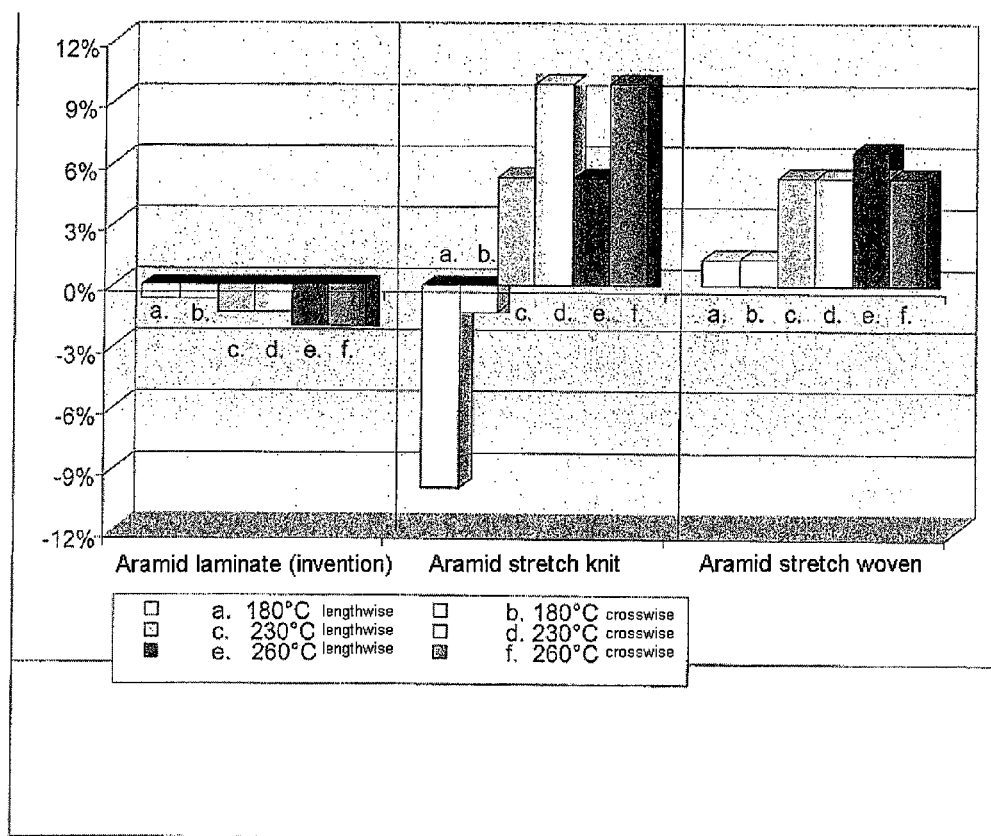

D) No Performance Change (Change of Essential Properties) after Thermal Loading:

FIG. 4 shows a graphic presentation of the dimensional stability after the furnace test after heat exposure ISO 17493 for different product samples and different temperatures.

The first sample "aramid laminate" is a variant of the invention in the form of a three-layer laminate with the following structure:

The first textile layer (cf. layer 20 according to FIG. 1) is designed in the form of a one-bed piqué layer of 100% aramid with a basis weight of 220 g/m$^2$ (Nomex Comfort fiber). Manufacturer (knitter) of the knitwear: Fuchshuber Technotex GmbH, article designation "Piqué Nomex".

The barrier layer (cf. layer 40 according to FIG. 1) is designed in the form of an ePTFE membrane with article number 4410028 of W.L. Gore & Associates GmbH. The second textile layer (cf. layer 30 according to FIG. 1) is designed in the form of a double-bed interlock-right/right layer of 100% aramid with a basis weight of 220 g/m$^2$ (Nomex Comfort fiber). Manufacturer (knitter) of the knitwear: Fuchshuber Technotex GmbH, article number 22928. The entire basis weight of the first sample is about 470 g/m$^2$.

In the second sample "aramid stretch knit" (knitwear) a known variant of a one-layer product with 96% aramid is involved (Nomex Comfort fiber) and 4% Lycra from Activetex (part no.: AT 77255 DF fine rib).

The third pattern "aramid stretch woven" (woven fabric) is also a known variant of one-layer product with 96% aramid (Nomex Comfort fiber) and 4% Lycra (part no. 44119190) from T. Fritsche GmbH.

FIG. 4 shows the dimensional stability according to the furnace test (the behavior relative to dimension changes shown) after heat exposure according to ISO 17493 for different product samples and different temperatures. The aforementioned three samples, aramid laminate, aramid stretch knit and aramid stretch woven, were used as product samples. Samples were then held for 5 minutes at a set temperature in a furnace. The dimension change was then determined. The thermal treatment is supposed to demonstrate that the textile changes as little as possible and can therefore be reused. The dimensional stability in the length direction (lengthwise) and also in the transverse direction (crosswise) is also shown in FIG. 4 for different temperatures.

FIG. 4 shows that the first sample, aramid laminate, according to the invention is characterized by a high dimensional stability, whereas the second or third samples have much poorer values especially at higher temperature loading. Positive values of the dimensional stability shown in FIG. 4 characterize an expansion of the corresponding product, whereas negative values characterize shrinkage of the corresponding product.

Minimum requirements are defined in application standards (for example, ISO 11612±5%). Comparison of the products of the three samples shows that temperature treatment of the first sample (variant of a laminate according to the invention) has essentially no effect. In the aramid knitwear (second sample) with elastane heat treatment leads to strong dimensional changes. During use of elastic fibers in the structures, they are destroyed at temperatures of >200° C. and lose dimensional stability.

Figure 5A:
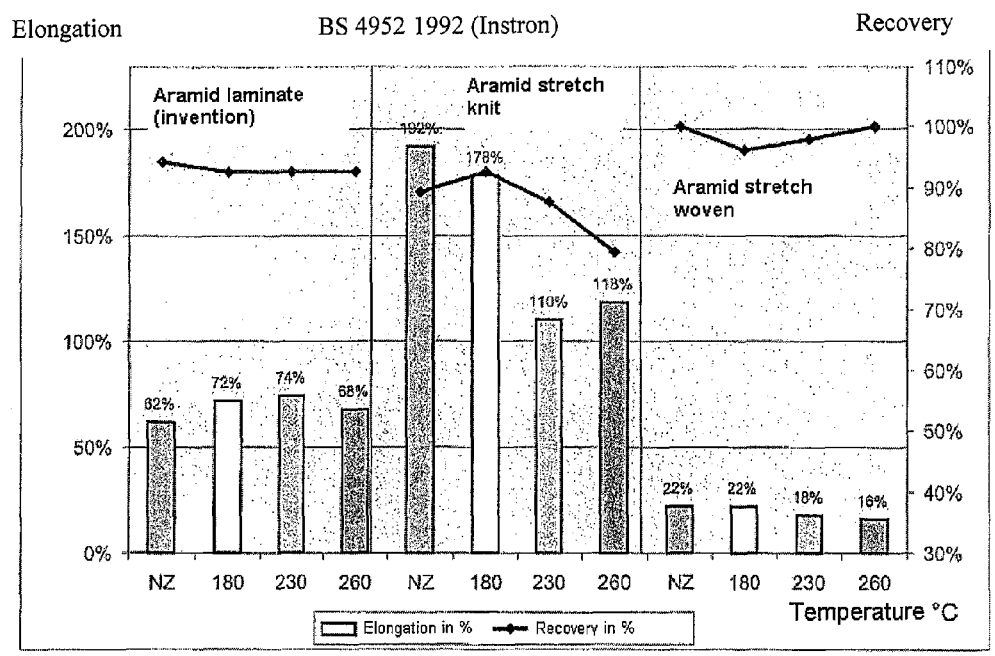
Figure 5B:
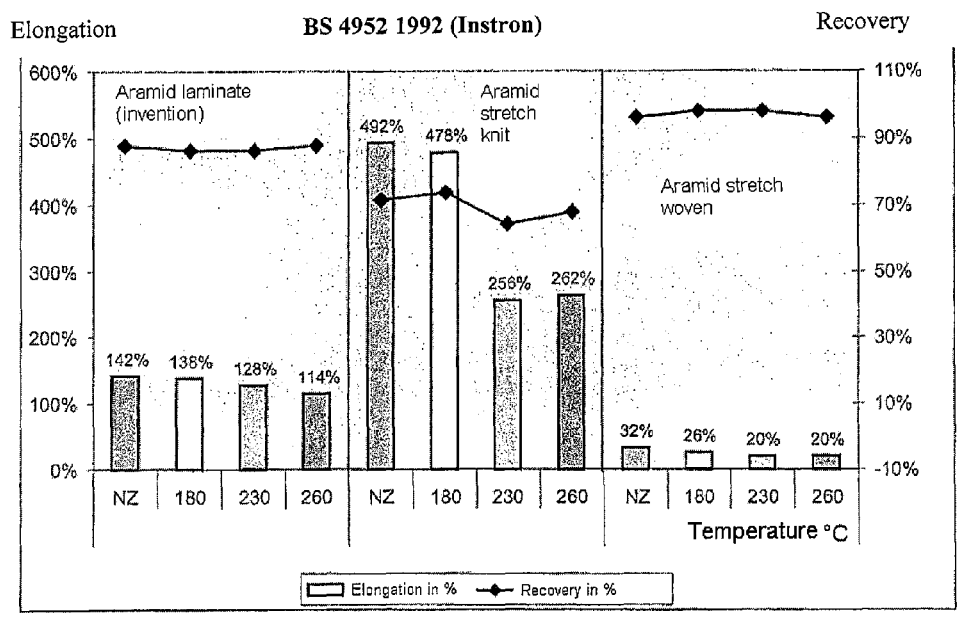

FIG. 5 shows a graphic presentation relating to elongation/recovery in the longitudinal direction (FIG. 5A) and transverse direction (FIG. 5B) for different temperatures for the three same product samples as mentioned above and explained with reference to FIG. 4. The abbreviation NZ characterizes the new condition of the corresponding product.

The laminate according to the invention reacts only slightly (in comparison with the other samples essentially not at all or negligibly) to thermal loads both in the longitudinal or transverse direction and in the elongation behavior or in elastic recovery (recovery). On the other hand, the aramid stretch knit under these thermal loads does not show sufficient recovery (recovery) and falls below 70%. The aramid stretch knit after thermal loading above 200° C. loses more than 200% elongation in the transverse direction The aramid stretch woven overall does not reach sufficiently high elongation due to its design and after thermal loading at more than 200° C. loses more than 50% of the original elongation. FIG. 6 shows in this context another graphic presentation of the drop in elongation versus temperature for the aramid laminate according to the invention, on the one hand, and the aramid stretch woven, on the other hand. It is also apparent in FIG. 6 that the laminate according to the invention reacts only slightly to thermal loads in elongation behavior, whereas the aramid stretch woven after thermal loading significantly loses its original elongation.

Figure 8:
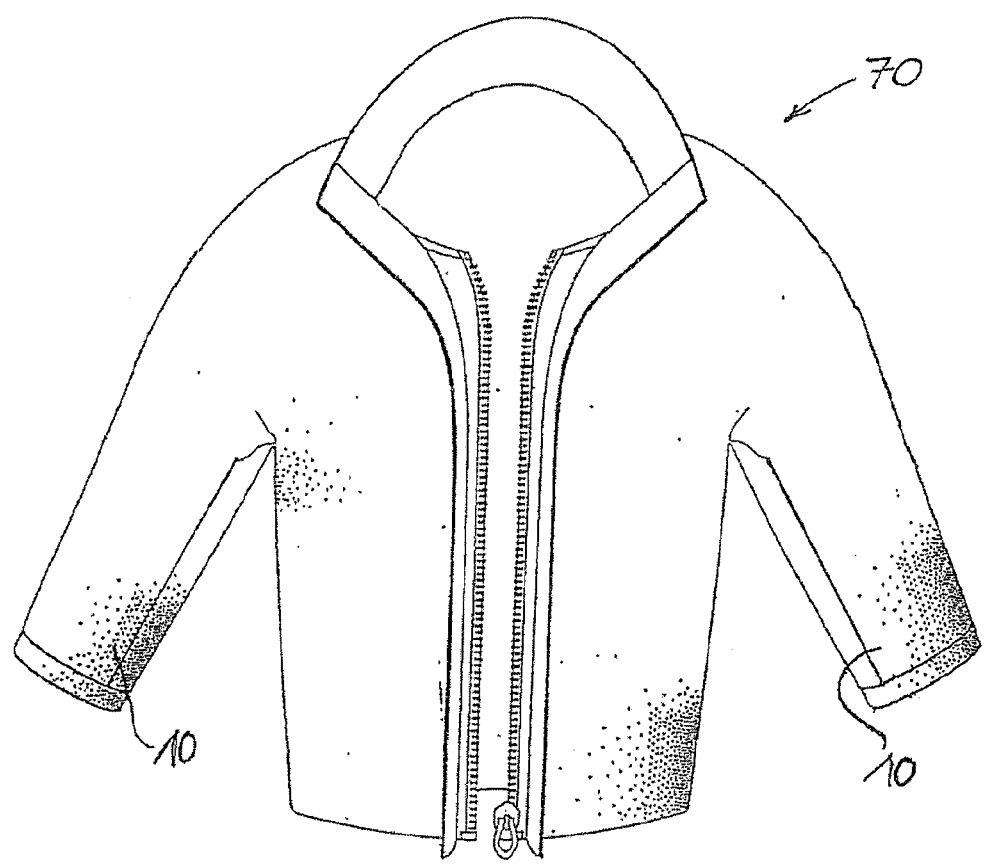

FIG. 8 shows a clothing article 70 in the form of outer clothing, for example, a firefighter's jacket, which is constructed at least partially with laminate 10 of the invention according to FIG. 1.

The term "elastic stretchiness", as used in conjunction with the present invention, denotes the property of a material that has a low stress or loading requirement (i.e., a low elongation force) in order to stretch the material. And which, after this can reassume its original shape (original size and shape) or, in other words, full or high recovery of the original dimensions after stretching, biasing, or as the stretching force is no longer applied.

The term "elastic recovery/elasticity" refers to the behavior that a material exhibits, when loading is completed, ideally rapid recovery with limited permanent deformation.

The term "permanent elasticity" denotes the property of the laminate according to the invention that the elasticity even after heating of the laminate for 5 minutes at a temperature of 230° C. is still present.

In connection with the present invention, textile fabric or textile layer is understood to mean a woven, knit, a warp-knit, nonwoven or combination thereof. The textile layer has synthetic and natural fibers. Fiber blends from natural and synthetic fibers are also possible. The term fiber also includes filaments (fibers of undefined length) like monofilaments, multifilaments or staple fibers. The fibers are preferably in the form of yarns. Yarn in this invention is understood to mean a continuous thread of a number of fibers and/or filaments in bundled form, usable to produce textiles, for example, by weaving or knitting. The linear density of the employed yarn preferably lies between 50 dtex and 500 dtex before coating.

Polyolefins, polyamides, polyesters, regenerated cellulose, cellulose acetate, rayons, acetate, acrylics, glass materials, modacryls, cotton, wool, silk, linen, jute and their mixtures can be used as materials for the textile layers.

The term "flame-retardant" in the context of this invention means that both the textile layer (fabric) and the material have limited flame propagation. Standard ISO 14116:2008 establishes performance requirements for limited flame propagation of materials, which are based on the results of testing according to ISO 15025 (corresponds to EN 532). The performance is expressed by an index of limited flame propagation. Three performance steps are established:

in index 1 materials no flame propagation occurs, hole formation can occur during flame contact;

in index 2 materials no flame propagation occurs, hole formation does not occur during flame contact;

in index 3 materials no flame propagation occurs, hole formation does not occur during flame contact and there is only limited afterburning.

For firefighter protective clothing a material of index 3 (corresponding to ISO 11613:1999) is required.

The term "low flammability" material in the context of the invention means that the material has an LOI (limited oxygen index) of greater than 25.

The term "heat-resistant" means that the material withstands temperature of more than 180° C. in a time of 5 minutes according to the furnace test of ISO 17493.

The water vapor penetration resistance Ret value according to ISO 11092 is a specific material property of fabrics (textile fabrics and functional layer according to the invention) or combined materials (laminates), which determines the latent heat evaporation flow through a stipulated surface with equivalent partial pressure gradient.

"Water vapor-permeable" defines a material having a water vapor penetration resistance Ret of less than 100 m² Pa/W. The fabric preferably has a Ret of less than 20 m² Pa/W. The water vapor permeability is measured by different methods, for example, ISO 11092 or the Hohenstein MDM dry method, which is described in the standard test procedure no. BPI 1.4 (1987) of the Clothing Physiological Institute e.V. Hohenstein.

"Porous" is understood to mean a material having very small microscopic pores through the inner structure of the material and the pores form a connected continuous connection or path from the surface to the other surface of the material. According to the dimensions of the pores the material is therefore permeable to air and steam, but liquid water cannot pass through the pores. Measurement of pore size can occur with a Coulter Porometer™ produced by Coulter Electronics, Inc., Hialeah, Fla. The Coulter porometer is an instrument that determines an automatic measurement of pore size distribution in porous media according to the method described in ASTM Standard E1298-89. The pore size cannot be determined for all available porous materials with the Coulter porometer. In such a case the pore sizes can also be determined using a microscope, like a light microscope or electron microscope.

During use of a microporous membrane it has an average pore size between 0.1 and 100 μm, preferably the average pore size is between 0.2 and 10 μm.

Water Entry Pressure Test/Water Penetration Resistance:

The water entry pressure test is a hydrostatic resistance test that is essentially based on the fact that water is forced against one side of the material sample and the other side of the material sample is observed for passage of water. The water pressure is measured according to a test method in which distilled water at 20±2° C. is placed on a material sample with a surface of 100 cm² increasingly under pressure. The water rising pressure is 60±3 cmH₂O/min. The water pressure is the pressure at which water appears on the other side of the sample. A precise procedure is regulated in standard EN 20811 from 1992. "Water-tight" is understood to mean that the material withstands a water entry pressure of at least 8 kPa according to EN 343 from 2003.

The invention claimed is:

1. A laminate comprising:
   at least a first textile layer and a second textile layer;
   the first textile layer or the second textile layer having at least one heat-resistant fiber; and
   at least one barrier layer arranged between the first textile layer and the second textile layer, said barrier layer being joined to the first textile layer and the second textile layer;
   the first textile layer being designed in the form of one-bed knitwear with tuck loops or double-bed knitwear with tuck loops and the second textile layer in the form of double-bed knitwear without tuck loops;
   wherein the laminate after heating at a temperature of 230° C. for 5 minutes has an elastic stretchiness in the longitudinal direction of at least 50% and an elastic stretchiness in the transverse direction of at least 25%.

2. The laminate according to claim 1, in which the first textile layer is the double-bed knitwear with tuck loops, and in which the double-bed knitwear is an interlock piqué knit.

3. The laminate according to claim 1, in which the second textile layer is the double-bed knitwear without tuck loops, and in which the double-bed knitwear is an interlock-right/right knit.

4. The laminate according to claim 1, in which the one-bed knitwear with tuck loops is a piqué knit.

5. The laminate according to claim 1, in which the first textile layer and the second textile layer have at least one heat-resistant fiber.

6. The laminate according to claim 1, in which the laminate after heating at a temperature of 230° C. for 5 minutes has an elastic stretchiness of at least 30% in the transverse direction.

7. The laminate according to claim 1, in which the laminate after heating at a temperature of 230° C. for 5 minutes has an elastic stretchiness of at least 25% in the longitudinal direction.

8. The laminate according to claim 1, in which the laminate after heating at a temperature of 230° C. for 5 minutes has an elastic stretchiness in the longitudinal direction of at least 50% with an elastic recovery of at least 80% and an elastic stretchiness in the transverse direction of at least 25% with an elastic recovery of at least 95%.

9. The laminate according to claim 1, in which the laminate after heating at a temperature of 230° C. for 5 minutes has an elastic stretchiness in the longitudinal direction of at least 70% with an elastic recovery of at least 80% and an elastic stretchiness in the transverse direction of at least 30% with an elastic recovery of at least 95%.

10. The laminate according to claim 1, in which the heat-resistant fiber is selected from the group consisting of aramids, polyimides, polyamide-imides, cellulose fibers, melamine resins, and polybenzimidazole (PBI).

11. The laminate according to claim 10, in which the fiber is an aramid fiber.

12. The laminate according to claim 1, in which the first textile layer and the second textile layer each form a permanently elastic laminate without using a thermoplastic or elastomer yarn.

13. The laminate according to claim 1, in which the barrier layer is joined to the first textile layer and the second textile layer by means of a discontinuously applied glue.

14. The laminate according to claim 13, in which the glue is supplied in the form of glue spots or in the form of glue powder.

15. The laminate according to claim 1, in which the barrier layer is air-impermeable and water vapor-permeable.

16. The laminate according to claim 1, in which the barrier layer is air-impermeable.

17. The laminate according to claim 1, in which the barrier layer is liquid-impermeable.

18. The laminate according to claim 1, in which the barrier layer is water-tight and withstands a water entry pressure of at least 8 kPa (according to EN 20811-1992).

19. The laminate according to claim 1, in which the barrier layer is wind-tight, water-tight and water vapor-permeable.

20. The laminate according to claim 1, in which the barrier layer has a water vapor penetration resistance Ret of <20 m² Pa/W (ISO 11092).

21. The laminate according to claim 1, in which the barrier layer has an air permeability of no more than 50 L/m²/s (according to ISO 9237-1995).

22. The laminate according to claim 1, in which the barrier layer is a membrane or film.

23. The laminate according to claim 22, in which the barrier layer is a porous membrane.

24. The laminate according to claim 22, in which the membrane is selected from the group consisting of polyolefins, polyesters, polyvinyl chlorides, polyvinylidene chlorides, polyurethane and fluoropolymers.

25. The laminate according to claim 22, in which the membrane has an ePTFE barrier layer.

26. The laminate according to claim 25, in which the ePTFE membrane is provided with a continuous closed plastic layer.

27. The laminate according to claim 1, in which the laminate is designed to be flame-retardant with limited flame propagation according to the requirements of EN ISO 14116:2008.

28. The laminate according to claim 1, in which
 the first textile layer and a second textile layer each have a heat-resistant aramid yarn;
 the first textile layer is designed as a piqué knit and the second textile layer is an interlock-right/right knit; and
 the barrier layer has an ePTFE membrane, the barrier layer being joined to the first textile layer and the second textile layer by a discontinuously applied glue.

29. A protective clothing having a laminate according to claim 1.

30. The protective clothing according to claim 29, which is designed in the form of a coat, jacket, trousers, vest, overalls, hat, balaclava or glove.

* * * * *